United States Patent
Templeton et al.

(10) Patent No.: US 12,003,473 B2
(45) Date of Patent: Jun. 4, 2024

(54) NOTIFICATION SYSTEMS AND METHODS FOR CENTRALIZED THREADING AND PRESENTATION OF MESSAGES

(71) Applicant: OPEN TEXT CORPORATION, Waterloo (CA)

(72) Inventors: David Andrew Templeton, Drumbo (CA); James Dennis Hewitt, Waterloo (CA)

(73) Assignee: OPEN TEXT CORPORATION, Waterloo, CA (US)

( * ) Notice: Subject to any disclaimer, the term of this patent is extended or adjusted under 35 U.S.C. 154(b) by 0 days.

(21) Appl. No.: 18/355,507

(22) Filed: Jul. 20, 2023

(65) Prior Publication Data

US 2024/0031321 A1 Jan. 25, 2024

Related U.S. Application Data

(60) Provisional application No. 63/390,967, filed on Jul. 20, 2022.

(51) Int. Cl.
*H04L 51/216* (2022.01)
*G06F 9/54* (2006.01)
*H04L 51/046* (2022.01)

(52) U.S. Cl.
CPC ............ *H04L 51/216* (2022.05); *G06F 9/542* (2013.01); *H04L 51/046* (2013.01)

(58) Field of Classification Search
CPC ............................. H04L 51/216; H04L 51/046
See application file for complete search history.

(56) References Cited

U.S. PATENT DOCUMENTS

| | | | | |
|---|---|---|---|---|
| 8,577,967 | B1 * | 11/2013 | Chavez ................ | H04L 51/216 715/752 |
| 2018/0097755 | A1 * | 4/2018 | Mody ................... | H04L 51/046 |
| 2020/0402009 | A1 * | 12/2020 | Mandel ............... | G06Q 10/107 |
| 2021/0006524 | A1 * | 1/2021 | Muthuswamy ....... | H04L 51/216 |
| 2021/0150482 | A1 * | 5/2021 | Asadorian ............ | H04L 51/216 |
| 2023/0252980 | A1 * | 8/2023 | Kumar ................ | G10L 15/1815 704/257 |

* cited by examiner

*Primary Examiner* — Caroline H Jahnige
(74) *Attorney, Agent, or Firm* — SPRINKLE IP LAW GROUP (57) ABSTRACT

A notification center system receives a message from a message source, the message comprising a message body, the message body comprising parameter-value pairs. The notification center system processes the message body to obtain a contextual string from the parameter-value pairs, appends a source identifier to the message, the source identifier identifying the message source, and stores the message appended with the source identifier in a platform-neutral format in a message store. Utilizing the contextual string, the message is then grouped, with other message(s) or by itself, with a message thread. The message is provided to a delivery mechanism for presentation of the message under the message thread. Content-aware contextual visual indicators may be determined for the message thread and the message based on different orders of specificity. The message thread and the message can then be displayed with their corresponding content-aware contextual visual indicators to provide additional insights.

20 Claims, 6 Drawing Sheets

NOTIFICATION SYSTEMS AND METHODS FOR CENTRALIZED THREADING AND PRESENTATION OF MESSAGES

CROSS-REFERENCE TO RELATED APPLICATION(S)

This application is a conversion of, and claims a benefit of priority under 35 U.S.C. § 119(e) from, U.S. Provisional Application No. 63/390,967, filed Jul. 20, 2022, entitled "NOTIFICATION SYSTEMS AND METHODS FOR CENTRALIZED THREADING AND PRESENTATION OF MESSAGES," which is hereby incorporated by reference herein for all purposes.

TECHNICAL FIELD

This disclosure relates generally to processing electronic messages in a network computing environment. More particularly, this disclosure relates to systems, methods, and computer program products for centralized threading and presentation of electronic messages.

BACKGROUND OF THE RELATED ART

Today, many electronic platforms, such as social networking sites, provide message feeds. Generally, these message feeds rely on a single stream in which messages from multiple sources are combined into a single message feed for a particular user.

Contrasting to single-stream message feeds, enterprise content management (ECM) systems can support multiple streams. ECM is sometimes referred to as document management or records management. ECM is known to those skilled in the art and thus is not further described herein.

An example of an ECM system is a content server that has been configured for managing electronic assets of an enterprise. Generally, these electronic assets are stored in a repository. In managing these electronic assets, the content server may notify its users for various reasons. For instance, the content server may notify a user that an asset has been removed, updated, added, replaced, shared, etc.

The content server can have many sources of information that it can plug into workflows. A user of the content server may have permission to access multiple workspaces within the content server. This means that the content server can send the entire corpus of workflow information about a project of interest to the user through multiple streams of message feeds corresponding to multiple workspaces. However, the user must constantly scan each message feed to get information on the specific project of interest. This uncoordinated flood of information across multiple message feeds can be inefficient, distracting, and frustrating.

SUMMARY OF THE DISCLOSURE

This disclosure provides an enhanced Notification Center in which single streams from multiple message sources are logically combined for workspaces and delivered to users through various delivery mechanisms/channels. In some embodiments, a method may comprise receiving, by a notification center system executing on a processor, a message from a message source, the message comprising a message body, the message body comprising parameter-value pairs. The notification center system is operable to process the message body to obtain a contextual string from the parameter-value pairs, append a source identifier to the message, the source identifier identifying the message source, and store, in a database, the message appended with the source identifier in a platform-neutral format. In some embodiments, utilizing the contextual string thus obtained, the message can then be grouped, with other message(s) or by itself, with a message thread and provided to a delivery mechanism for presentation of the message under the message thread.

In some embodiments, the message source is one of a plurality of message sources registered with the notification center system, the plurality of message sources having disparate message formats. At delivery time, the message can then be rendered from platform-neutral format to a presentation format supported by the delivery mechanism.

In some embodiments, the notification center system is further operable to derive or otherwise determine a content-aware contextual visual indicator for the message thread based on contents of the message thread. In some embodiments, this may entail parsing contents of the message thread, including parsing the message body of the message, extracting tags from the contents of the message thread, determining, based on an order of specificity, an icon or graphical element corresponding to a parent node object, a node object, a user, a universal resource locator, or a default, and utilizing the determined icon or graphical element as the content-aware contextual visual indicator for the message thread. In some embodiments, a content-aware contextual visual indicator can be determined for the message through a similar process, but based on a different order of specificity which defines a node object, a user, a universal resource locator, a parent node object, and a default (e.g., for information only).

In some embodiments, the notification center system can be implemented as part of a content server or as a service provided to the content server. In embodiments disclosed herein, the notification center system is agnostic to message sources as well as to delivery channels. This allows the notification center system to scale without being affected by adding and/or dropping a message source or delivery channel.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

An example of an ECM system is a content server configured for managing electronic assets of an enterprise stored in a repository. The content server may notify its users for various reasons. As a non-limiting example, the content server may leverage a Notification Center to process electronic messages (which are referred to hereinafter as "messages") from various sources (e.g., documents, users, external systems, etc.) and notify its user(s) to check the electronic messages via the Notification Center.

Figure 1:
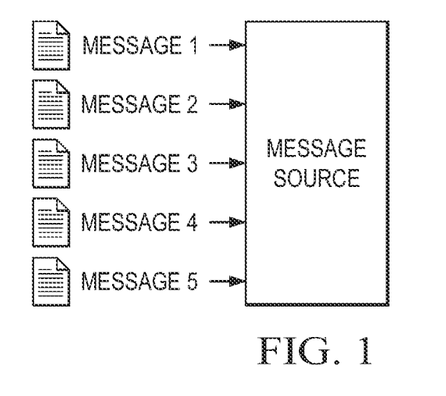
FIG. 1 shows how a message source may produce multiple messages.

As illustrated in FIG. 1, a message source may produce multiple messages. These messages are said to be "posted" and may have no relation to one another. That is, a message source may produce random messages that may have no inherent relationship between them. To deliver these messages, the Notification Center may employ various delivery mechanisms, such as a native content server user interface, an email channel, a browser popup window, video conference channel, a short message system (SMS) channel, etc.

Generally, the Notification Center does not have an ability to provide a grouping structure for such random messages. So, a user may receive random content server messages, emails, browser popup windows, video conference chats, SMS messages, etc. However, users generally prefer contextual threads so that they can view a stream of like-messages.

To this end, this disclosure provides an enhanced Notification Center in which single streams from multiple sources are logically combined for workspaces. The term "workspace" refers to an ECM platform module that uses pre-built templates and a visually-driven user interface to create customized work areas to share and access content needed for a common task or goal. Using pre-built templates, non-technical users can create dedicated workspaces, aggregating content, data, people and tasks related to a project or case. Content managed by the content server can be made seamlessly available to those who need it, when they need it, with governance policies automatically and transparently applied. Content managed within such workspaces can be shared with contractors, partners or external parties, without compromising enterprise control and security. These workspaces provide a compliant area to exchange information without requiring computer programming knowledge.

A user of the content server may have permission to access multiple workspaces. With the enhanced Notification Center for the content server, threads of messages can be processed and grouped in a logical manner. For example, User A is concerned about a certain project. Previously, User A must constantly scan a message feed to get the specific project information. The content server can have many sources of information that it can plug into workflows. If the content server sends the entire corpus of workflow information about the project of interest to User A, this can be distracting and frustrating.

Figure 2:
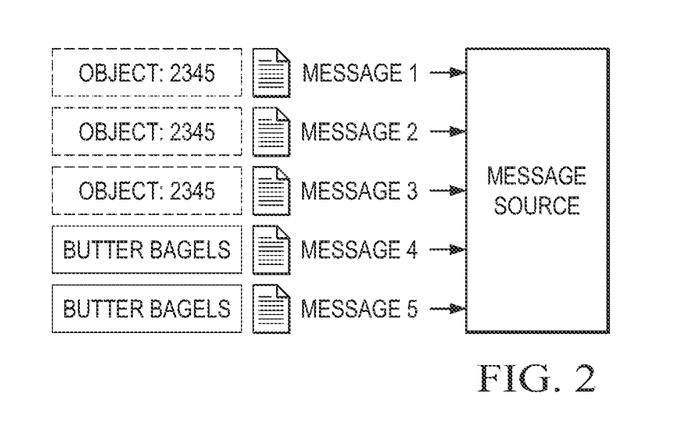
FIG. 2 shows how messages can have different metadata keys.

In some embodiments, the corpus of information about the project of interest is divided into "threads of information" using, for instance, metadata keys and/or object identifier, as illustrated in FIG. 2. In some cases, a message generator may provide a metadata key that can be used to link like-messages together. This metadata key is immaterial to the actual message content and is bound to the message source. That is, the same metadata key from different messages sources are inherently unique.

Figure 3:
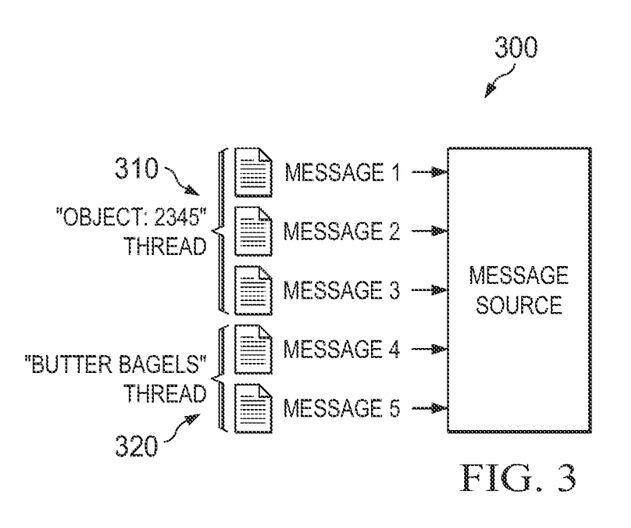
FIG. 3 depicts a diagrammatical representation of a messaging grouping structure according to some embodiments.

FIG. 3 depicts a diagrammatical representation of a messaging grouping structure 300 with a first level threads 310 for accessing the messages and a second level thread 320 for detailed messages. Unlike email grouping, which relies on the subject and replies for relating messages, messaging grouping structure 300 utilizes metadata to link messages and does not rely on the subject of the messages. That is, the message content can be completely different and the messages can still be linked. Since the metadata is source-generated, the grouping is more accurate than the subject-based email grouping. Further, according to messaging grouping structure 300, grouping is done on the source level and then the metadata key is utilized. Message removal is performed in a similar manner. That is, the metadata key is used to remove messages grouped by a thread.

In this way, User A can relate threads of information and/or bundle the information into a more consumable form. For instance, through a menu provided by the Notification Center, user A can pull everything piece of information/messages for a particular thread together and drill down from there.

Figure 4A:
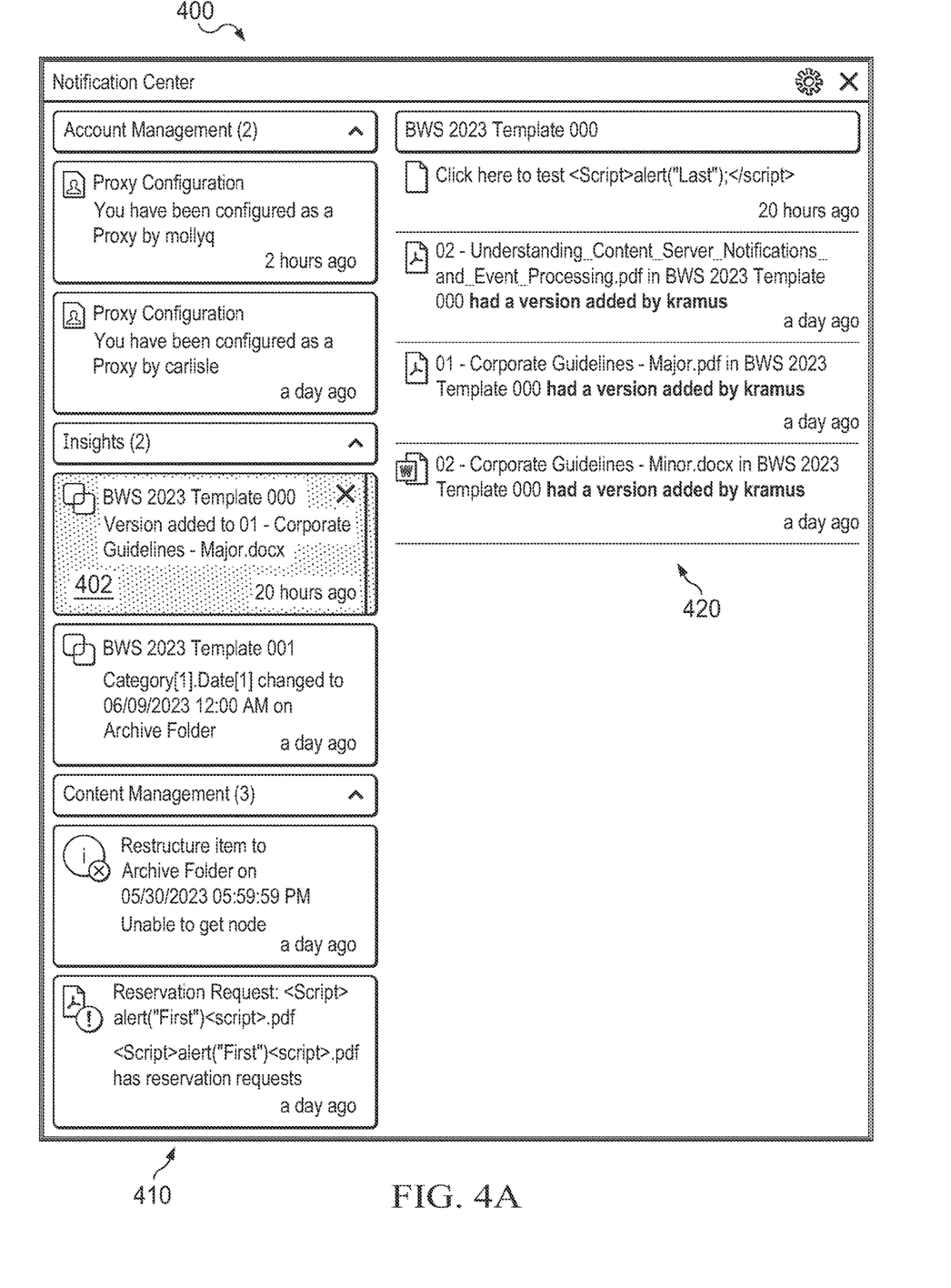
FIG. 4A depicts a diagrammatical representation of an example of a Notification Center user interface according to some embodiments.

Referring to FIG. 4A, which shows an example of a Notification Center user interface 400, User A could be viewing different message threads (e.g., a list of summaries) at the summary level 410 and select a message thread or summary 402 to view message details at the message level 420. The selection could open more messages (at the message level 420) bundled under the message thread or summary 402. The Notification Center can group messages through multi-step operations. In this case, the Notification Center can start new threads of messages and bring them into one view through the Notification Center user interface 400. In this way, User A can view these threads of messages in a centralized place, instead of receiving multiple messages through various delivery channels.

In some embodiments, the messaging grouping structure can be based on different message grouping models. In the example above, message grouping is done using a source-generated metadata key (e.g., "butter bagels"—a contextual string generated by a message source, for instance, a records management system shown in FIG. 5) that does not have to be part of the incoming messages. Another message grouping model may group messages by workspace. Yet another message grouping model may group messages by workflow identifiers (IDs). Another message grouping model may leverage document IDs.

In some embodiments, multi-level message grouping may create a very targeted multi-level thread. For example, a workspace-based message grouping model may be applied to a set of incoming messages to produce a subset of messages. Then, the subset of messages is divided again based on User A's workspace, a workflow ID, etc.

These message grouping mechanisms can be dynamic in nature. For instance, a message source may dynamically generate a metadata key and sends a message with the metadata key to a computer system implementing the Notification Center. The Notification Center stores the metadata key and uses the metadata key and the body of the message plus other metadata (e.g., the date the message was sent, who sent the message, and so on). The Notification Center may apply a hash function to the metadata key to produce a hash and store the hash (and not the metadata key). In this way, the content of the metadata key disappears. The hash thus created represents a source-specific fingerprint (with the metadata key plus other information) that uniquely identifies the message or thread of messages. The Notification Center then generates a notification in the native content server user interface in near real time as the message is received. Additionally, the message may be delivered through other channels such as email delivery, if the email delivery option is turned on.

The message grouping mechanisms disclosed herein incorporate the source-generated metadata key to include contextual, even dynamic, information in grouping messages. Additionally, the message grouping mechanisms employ multi-level aggregation based on different and/or hierarchical message grouping models. For example, as illustrated in FIG. 4A, members of a team that share a workspace of a content server (CS) for "BWS 2023 Template 000" will receive messages having a message key "BWS 2023 Template." Under this thread, aggregation of messages can be based on attribute(s). For instance, any attribute that indicates a document change. If User A is viewing documents (e.g., "Corporate Guidelines—Major") from different team members, User A may want to be notified when a document changes status (e.g., deleted, modified, a new version added, etc.). That is, messages thus grouped can have state changes. Within a thread, messages are arranged in a reverse chronological manner. User A can drill down view levels and control the level of details as well as the types of messages presented through the Notification Center.

In some embodiments, the Notification Center can determine and generate content-aware contextual visual indicators, for example, in the form of various types of icons displayed with messages. In some embodiments, messages can be constructed from a combination of text (parsed from the message) and markup tags. These tags represent different constructs used in the final rendering of the message to the user. While some of these tags are similar to HTML tags, '[b]', etc. There are system specific tags for object "[node_nnnn]", user "[user_nnnn]", object container "[parentnode_nnnn]", and internal URL link "[csurl xxxx]".

Figure 4B:
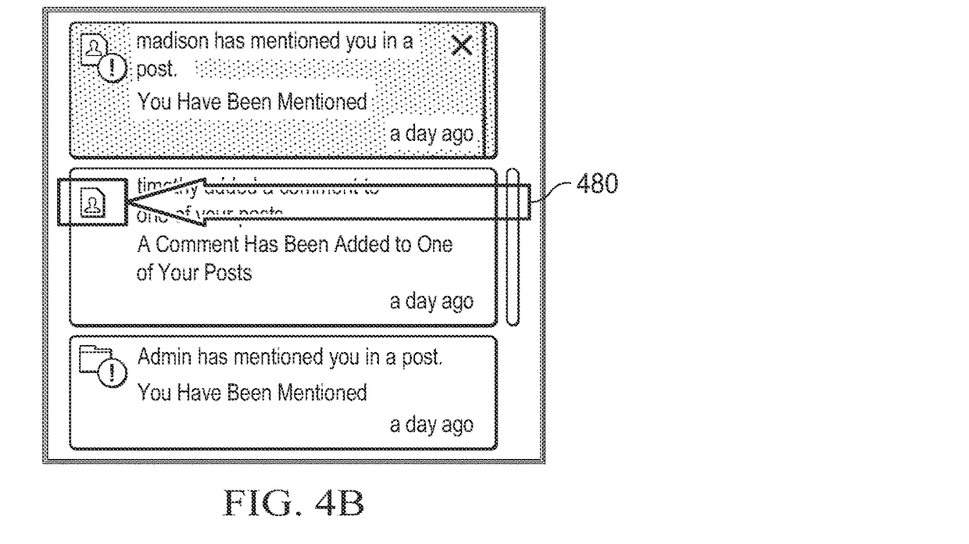
FIG. 4B depicts a diagrammatical representation of an example of a Notification Center user interface with a content-aware contextual visual indicator displayed next to a summary listing according to some embodiments.

In the process of rendering a content-aware contextual visual indicator, contents of an associated message thread are used. For instance, as shown in FIG. 4B, for the content-aware contextual visual indicator 480 to be displayed in the summary listing, the message body is parsed and the system tags are extracted. Then, the following order determines what is presented.

1. [parentnode_nnnn]
2. [node_nnnn]
3. [user_nnnn]
4. [csurl xxxx]
5. [info]

That is, a system implementing the Notification Center (e.g., as middleware between a content server and a user application such as an email application) is operable to search for a parent node object, then a node object, then, a user, a URL, info, etc. For the message thread, the parent node icon would be rendered. The node-type icon (e.g., a PDF icon) is very specific and, therefore, would not be placed in the message thread unnecessarily. If the first four tags are not found in the message body, the default "info" icon will be used. The goal is that there is a relevant content-aware contextual visual indicator with each message thread.

Figure 4C:
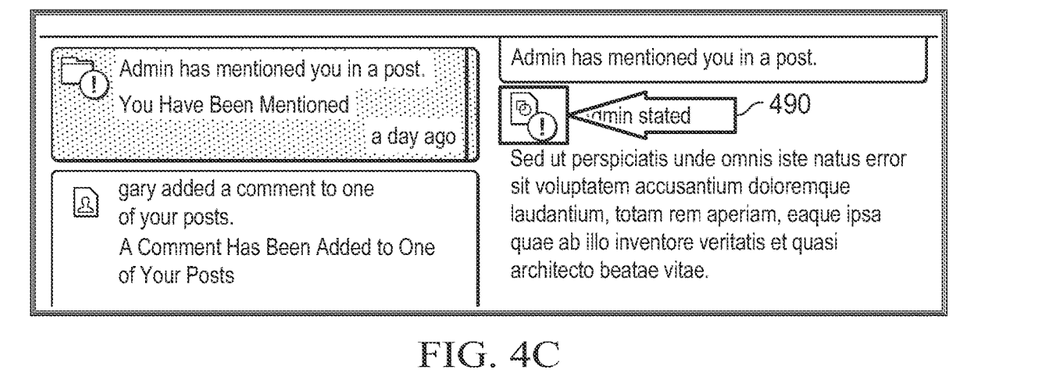

For the message thread details, a similar process is performed, but may involve a different order of the tags. FIG. 4C shows an example of a content-aware contextual visual indicator 490 generated based on the contents of an associated message. At the message level, which is below the message thread/summary listing, user action takes priority over the node (if there's one).

1. [node_nnnn]
2. [user_nnnn]
3. [csurl xxxx]
4. [parentnode_nnnn]
5. [info]

Because the context for the message is more specific than the summary, the Notification Center may display different icons at the summary level and at the message level. At the message level, the "info" icon again serves as a failsafe or a default option.

The Notification Center provides different types of icon collections, each having many varieties that mean something different from node to node (e.g., a content server). Users of the content server who already are familiar with the user interface of the content server, may recognize various types of icons, e.g., a PDF icon. The process and the order by which the Notification Center determines an appropriate icon for an associated message gives additional contextual meaning to these icons, making them content-aware contextual visual indicators.

Figure 5:
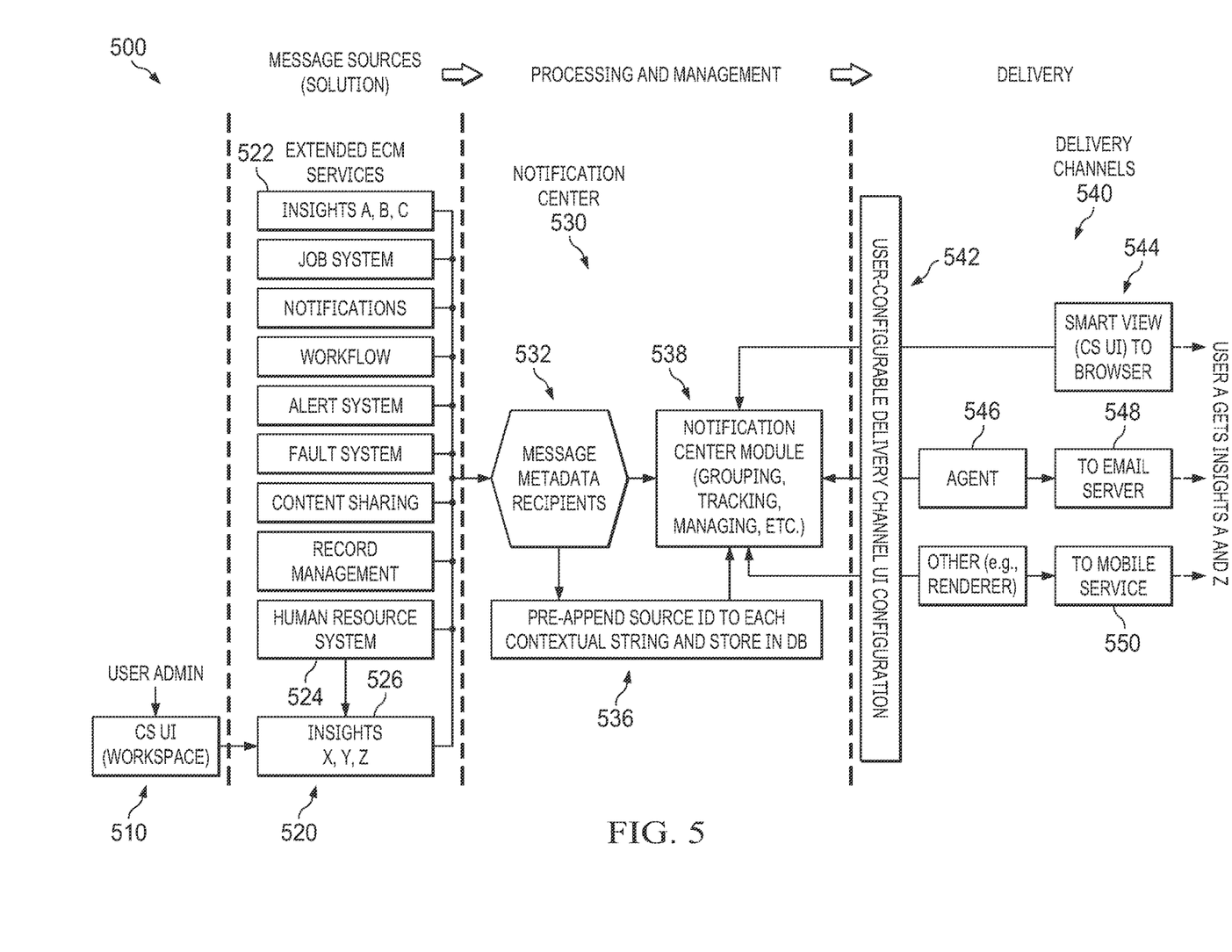
FIG. 5 depicts an example of an operation flow according to some embodiments.

Referring to FIG. 5, which depicts an example of an operation flow 500, a message source (e.g., a content server) of a plurality of message sources 520 may receive a notification (e.g., via an extended ECM service such as a Notifications system) that a document (e.g., "[Node_25378344]") is added, via a content server user interface 510, to a monitored workspace of the content server (e.g., "[ParentNode_25376670]") by a user (e.g., "[User_24767089]") of the content server.

In this case, the content server is configured to store this information in a data structure and pass a message to the Notification Center (e.g., a Notification Center 530 comprising a processing stage 532, a database 536, and a notification center module 538 for tracking, grouping, managing, etc.). Below is an example of a data structure used by a content server to store a message thread:

UserID 1000
ThreadID 2919728
SourceID 1
Hashtoken 'ba1fb852accc098de9b5cb9236123f7374f-906b8aa2214c82fbb7fda9413763d'
State 0
Deleted 0
EventDate 2023-06-02 12:43:44.000
ExpiresOn 2023-06-19 12:43:44.000
Total 0
Unread 2
Dirty 0

The content server may specify a relationship of the message thread to the message body as follows:

ID 2919728
BodyID 2919727
Head 0
State 0

As illustrated in FIG. 5, the Notification Center can be communicatively connected to a variety of message sources. These message sources provide messages in a certain format that includes a message body containing parameter-value pairs, such as subject, recipient, etc. Below is an example of a message provided by a message source:

```
messageSet = Assoc{
  'sourceID': $MESSAGESOURCE_INSIGHTS,
  'toUserIDs': rec.UserID,
  'subject': messageAssoc.MessageCenter.subject,
  'shortMessage': messageAssoc.MessageCenter.short,
  'message': messageAssoc.MessageCenter.message,
  'messageType': $MESSAGETYPE_MESSAGE,
  'fingerprint': messageAssoc.MessageCenter.fingerprint,
  'aggregateKey': messageAssoc.MessageCenter.key,
  'messagetoken': messageAssoc.MessageCenter.messagetoken
}
```

Messages from a given message source are processed at the processing stage 532 to identify metadata of interest, such as a contextual string (e.g., a fingerprint) which can be used for grouping with other messages. If a message cannot be grouped with other messages, the message is treated as its own thread.

As a non-limiting example, parameters in a message body can be defined as follows:

sourceID: (required) The source id, from the set of registered in the system, for example:
$MESSAGESOURCE_INSIGHTS, $MESSAGESOURCE OBJECTMANAGEMENT, $MESSAGESOURCE SYNDICATIONNOTIFICATIONS
toUserIDs: (required) Recipients of the message, either single user id, list of user ids or a group id
subject: (required) short text used for presenting in the subject rendering
shortMessage: (required) short text version of the message for delivery channels
message: (required) full text of the message for the user(s)
messageType: the state of the message. Must be one of the following
$MESSAGETYPE ALERT, $MESSAGETYPE CONFIRMATION, $MESSAGETYPE ERROR, $MESSAGETYPE INFORMATION, $MESSAGETYPE_MESSAGE
subjectDecoration: optional solution provided override for the subject decoration.
messageToken: optional solution provided character string used for thread based management, like deleting the contents of the thread to allow the addition of new messages.
numberOfDays: optional number of days to retain the message. By default, this is unlimited. The message will be retained the lesser of this value or the system defined value.

In some embodiments, messages from different message sources such as a workflow system, a content server, a content sharing/collaboration system, an email system, etc. may contain different parameter-value pairs. In some embodiments, messages from the same message source may also be different. For instance, suppose an email server is communicatively connected to the Notification Center as a message source, an email from User A, an email from User B, and an automated email will all look different when provided to the Notification Center.

In some embodiments, message sources 520 can be implemented as services. Each message source is operable to construct and produce contextual strings that group or otherwise thread relevant, timely messages together and send these contextual strings to the Notification Center 530. For example, the "Insights A, B, C" 522 can be implemented as a lightweight version of a notifications service hosted by a content server. In this case, through a user interface of the content server, a user can select, from a predefined list shown in the user interface of the content server, a single button corresponding to the "Insights A, B, C" 522 to gain insights on a particular project, location, or document. Such insights can be attached to or associated with a workspace. A user who gains access to the workspace can opt out so as to receive some, but not all, of the associated insights. As another example, a user can gain insights on subjects of interest (e.g., "Insights X, Y, Z" 526) directly from a message source (e.g., through a workspace 524 in the content server for a human resource system) or through the Notification Center 530 (e.g., via a smart view 544 which can provide, through the content server, multi-source insights wanted by the user). One the insights are formulated for a user, a message is sent (via an application programming interface call) to the Notification Center.

In some embodiments, the Notification Center is operable to process, at the processing stage 532, each message received from a message source, extract a contextual string (e.g., a fingerprint), append a source ID to the contextual string, and store the processed message in a database 536. Each message source is registered with the Notification Center and has a service ID. In some embodiments, at the processing stage 532, the Notification Center may make a call (via an application programming interface to the content server) to validate the user (e.g., a message recipient) with the content server.

As alluded to above, the contextual string obtained from the message body of each incoming message can be used by the Notification Center for grouping and aggregating incoming messages. As a non-limiting example, a notification center module 538 is configured for performing this message grouping. In some embodiments, the notification center module is also configured for tracking the grouped message (message threads), metadata, and corresponding message recipients. In some embodiments, the notification center module is further configured for managing messages received from message sources (e.g., holding and cleaning up after 90 days of receipt).

In some embodiments, once an incoming message is processed, the Notification Center stores the processed message in a database or message store as follows:

| | |
|---|---|
| ID | 2919729 |
| SourceID | 1 |
| MessageType | 0 |
| Subject | '[Node_25376670]' |
| SubjectDecoration | '[parentnode_25376670]' |
| Message | '[Node_25378344] was added to [ParentNode_25376670] by [User_24767089]' |
| ShortMessage | 'Added [Node_25378344]' |
| AggregateKey | NULL |
| EventDate | 2023-06-02 12:43:07.247 |
| ExpiresOn | 2023-06-19 12:43:07.000 |
| MessageToken | '' |

Here, "SubjectDecoration" is derived and represents the content-aware contextual visual indicator for the message thread. "Source ID: 1" indicates "MessageSource_Insights" and "Message Type: 0" indicates "MessageType_Message." The processed messages stored in the database or message store can be in a platform-neutral format, which can then be rendered or otherwise delivered through various delivery mechanisms/channels.

At the delivery layer, a user can configure (via a configuration user interface 542) what delivery channels and/or mechanisms to use and how the user wishes to receive insights through these delivery channels. The Notification Center is agnostic to how, why, and when messages are created and is also agnostic to how, why, and when the messages are delivered.

Based on the user-specified configuration, a content server notification center agent ("Agent" 546) may operate to obtain or receive threaded messages from the notification center module 538, bundle them for delivery (e.g., immediately, hourly, daily, weekly, etc.), and, based on a user configuration, make an email delivery through a connection 548 to an email server. Such an email can be rendered in some form of HTML. The agent may operate to generate a summary of the messages bundled together and deliver the summary with the bundled messages. Various other delivery channels can be used, individually or in combination.

For instance, the notification center module 528 may communicate processed messages to the smart view 544 in an HTML-rich format that can be delivered to a browser. With the HTML-rich format, a link to an object in the smart view is a relative link, rather than a full link, as in the case of an email. Other rendition formats are also possible. For instance, a mobile server or text messaging system may only accept text messages. Thus, a processed message in a text format is delivered through a connection 550 to the mobile server or text messaging system.

Different renderers for different delivery mechanisms are configurable by an administrator or by an end user. For example, an administrator user can configure the notification service module to connect to an email server and activate the email delivery mechanism. An end user can specify, e.g., via a content server user interface, that the user wants to receive insights by email but not workflow. This allows the user to control delivery mechanisms through the content server. As alluded to above, the notification center can be implemented as a pluggable module or service for a message source such as a content server. Likewise, the agent can also be implemented in various ways, depending on the use case.

As discussed above, this centralized messaging is different/independent from delivery channels (e.g., emails, pop-up windows, SMS messages, etc.). That is, secondary delivery channels can be added to a thread and a user can elect which secondary delivery channel messages to receive. For instance, when a workflow is completed, a confirmation message may be generated. This confirmation message can be removed after a pre-determined time window (e.g., three days). Removal of this message can be based on an attribute (e.g., time sent) and/or at the thread level (e.g., per the workflow ID).

Embodiments of the Notification Center disclosed herein is source-aware, thread-oriented, pre-processing of incoming messages for content server users prior to, and independently of, conventional delivery channels such as emails, popup windows, SMS, and so on. With the knowledge of the sources and information paths, the Notification Center provides a centralized place to view contextually threaded messages based on multi-level message grouping models according to source-generated metadata key, workspace, workflow, operation, attribute, etc. Yet, the Notification Center is agnostic to source systems as well as delivery mechanisms. This allows the Notification Center to scale well and not be affected by adding and/or dropping a source or a delivery channel. Further, while the Notification Center can be implemented as part of a larger system such as an ECM system or a content server, the Notification Center can be implemented as an independent service.

In some embodiments, a class notification engine may monitor and track changes in metadata of interest (e.g., any metadata having a class of "notification"). Once a change is detected, the class notification engine may communicate this change to the Notification Center. The piece of metadata has the same fingerprint (e.g., a hash generated from a string) which the Notification Center uses to thread messages together. The change is communicated to the Notification Center with the source ID and the unique fingerprint. In this case, the source ID, the fingerprint, and the user are deterministic to what the user sees via the Notification Center.

In some embodiments, the Notification Center provides a user interface for configuring settings of what kinds of notifications from what workspaces that the user wants to receive, whether secondary delivery channel(s) should be turned on, and so on. As illustrated in FIG. 5, at the high level, the Notification Center can provide a centralized, consistent information presentation layer to users. For a variety of services, the Notification Center serves as a centralized interface for information delivery, as well as a centralized place for message processing and management.

Figure 6:
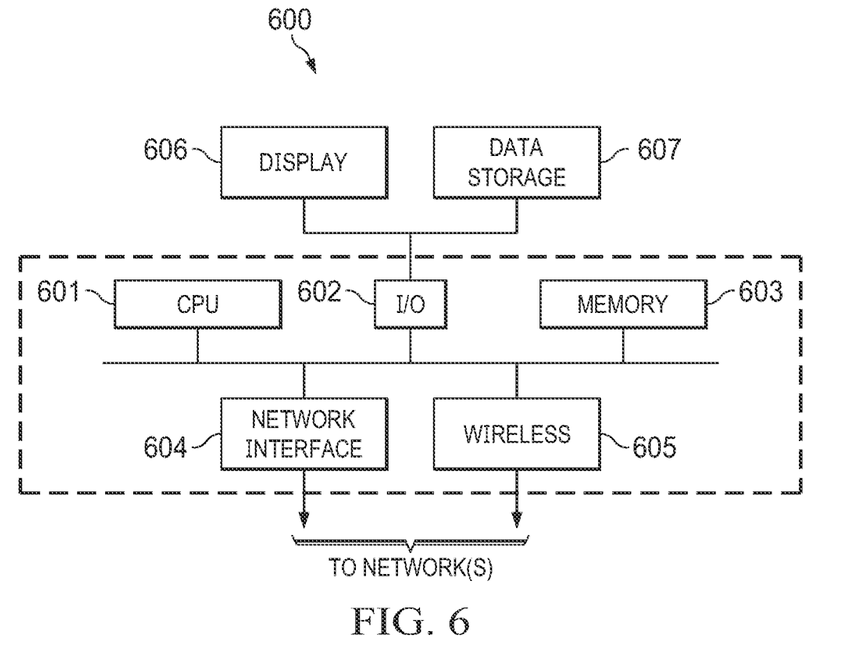
FIG. 6 depicts a diagrammatic representation of a data processing system for implementing an embodiment disclosed herein.

FIG. 6 depicts a diagrammatic representation of a data processing system for implementing an embodiment disclosed herein. As shown in FIG. 6, data processing system 600 may include one or more central processing units (CPU) or processors 601 coupled to one or more user input/output (I/O) devices 602 and memory devices 603.

Examples of I/O devices 602 may include, but are not limited to, keyboards, displays, monitors, touch screens, printers, electronic pointing devices such as mice, trackballs, styluses, touch pads, or the like. Examples of memory devices 603 may include, but are not limited to, hard drives (HDs), magnetic disk drives, optical disk drives, magnetic cassettes, tape drives, flash memory cards, random access memories (RAMs), read-only memories (ROMs), smart cards, etc.

Data processing system 600 can be coupled to display 606, information device 607 and various peripheral devices (not shown), such as printers, plotters, speakers, etc. through I/O devices 602. Data processing system 600 may also be coupled to external computers or other devices through network interface 604, wireless transceiver 605, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendix, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendix, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
   receiving, by a notification center system executing on a processor, a message from a message source, the message comprising a message body, the message body comprising parameter-value pairs;
   processing, by the notification center system, the message body to obtain a contextual string from the parameter-value pairs;
   appending, by the notification center system, a source identifier to the message, the source identifier identifying the message source;
   storing, by the notification center system in a database, the message appended with the source identifier in a platform-neutral format;
   grouping, by the notification center system utilizing the contextual string, the message with a message thread; and
   providing, by the notification center system, the message to a delivery mechanism for presentation of the message under the message thread.

2. The method according to claim 1, wherein the message source is one of a plurality of message sources registered with the notification center system, the plurality of message sources having disparate message formats.

3. The method according to claim 1, further comprising:
   determining a content-aware contextual visual indicator for the message thread, wherein the providing comprises providing the content-aware contextual visual indicator for displaying next to the message thread.

4. The method according to claim 3, wherein the determining a content-aware contextual visual indicator for the message thread comprises:
   parsing contents of the message thread, including parsing the message body of the message;
   extracting tags from the contents of the message thread;
   determining, based on an order of specificity, an icon or graphical element corresponding to a parent node object, a node object, a user, a universal resource locator, or a default; and
   utilizing the determined icon or graphical element as the content-aware contextual visual indicator for the message thread.

5. The method according to claim 1, further comprising:
   determining a content-aware contextual visual indicator for the message, wherein the providing comprises providing the content-aware contextual visual indicator for displaying next to the message on a level below the message thread.

6. The method according to claim 5, wherein the determining a content-aware contextual visual indicator for the message comprises:
   parsing contents of the message, including parsing the message body of the message;
   extracting tags from the contents of the message;
   determining, based on an order of specificity, an icon or graphical element corresponding to a node object, a user, a universal resource locator, a parent node object, or a default; and
   utilizing the determined icon or graphical element as the content-aware contextual visual indicator for the message.

7. The method according to claim 1, wherein the notification center system is implemented as part of a content server or as a service provided to the content server.

8. A notification center system, comprising:
   a processor;
   a non-transitory computer-readable medium; and
   instructions stored on the non-transitory computer-readable medium and translatable by the processor for:

receiving a message from a message source, the message comprising a message body, the message body comprising parameter-value pairs;

processing the message body to obtain a contextual string from the parameter-value pairs;

appending a source identifier to the message, the source identifier identifying the message source;

storing, in a database, the message appended with the source identifier in a platform-neutral format;

grouping, utilizing the contextual string, the message with a message thread; and providing the message to a delivery mechanism for presentation of the message under the message thread.

9. The notification center system of claim 8, wherein the message source is one of a plurality of message sources registered with the notification center system, the plurality of message sources having disparate message formats.

10. The notification center system of claim 8, where the instructions are further translatable by the processor for:

determining a content-aware contextual visual indicator for the message thread, wherein the providing comprises providing the content-aware contextual visual indicator for displaying next to the message thread.

11. The notification center system of claim 10, wherein the determining a content-aware contextual visual indicator for the message thread comprises:

parsing contents of the message thread, including parsing the message body of the message;

extracting tags from the contents of the message thread;

determining, based on an order of specificity, an icon or graphical element corresponding to a parent node object, a node object, a user, a universal resource locator, or a default; and utilizing the determined icon or graphical element as the content-aware contextual visual indicator for the message thread.

12. The notification center system of claim 8, where the instructions are further translatable by the processor for:

determining a content-aware contextual visual indicator for the message, wherein the providing comprises providing the content-aware contextual visual indicator for displaying next to the message on a level below the message thread.

13. The notification center system of claim 12, wherein the determining a content-aware contextual visual indicator for the message comprises:

parsing contents of the message, including parsing the message body of the message;

extracting tags from the contents of the message;

determining, based on an order of specificity, an icon or graphical element corresponding to a node object, a user, a universal resource locator, a parent node object, or a default; and utilizing the determined icon or graphical element as the content-aware contextual visual indicator for the message.

14. The notification center system of claim 8, wherein the utilizing comprises rendering the message from the platform-neutral format to a presentation format supported by the delivery mechanism.

15. A computer program product for a notification center system, the computer program product comprising a non-transitory computer-readable medium storing instructions translatable by a process of the notification center system for:

receiving a message from a message source, the message comprising a message body, the message body comprising parameter-value pairs;

processing the message body to obtain a contextual string from the parameter-value pairs;

appending a source identifier to the message, the source identifier identifying the message source;

storing, in a database, the message appended with the source identifier in a platform-neutral format;

grouping, utilizing the contextual string, the message with a message thread; and providing the message to a delivery mechanism for presentation of the message under the message thread.

16. The computer program product of claim 15, wherein the message source is one of a plurality of message sources registered with the notification center system, the plurality of message sources having disparate message formats.

17. The computer program product of claim 15, where the instructions are further translatable by the processor for:

determining a content-aware contextual visual indicator for the message thread, wherein the providing comprises providing the content-aware contextual visual indicator for displaying next to the message thread.

18. The computer program product of claim 17, wherein the determining a content-aware contextual visual indicator for the message thread comprises:

parsing contents of the message thread, including parsing the message body of the message;

extracting tags from the contents of the message thread;

determining, based on an order of specificity, an icon or graphical element corresponding to a parent node object, a node object, a user, a universal resource locator, or a default; and utilizing the determined icon or graphical element as the content-aware contextual visual indicator for the message thread.

19. The computer program product of claim 15, where the instructions are further translatable by the processor for:

determining a content-aware contextual visual indicator for the message, wherein the providing comprises providing the content-aware contextual visual indicator for displaying next to the message on a level below the message thread.

20. The computer program product of claim 19, wherein the determining a content-aware contextual visual indicator for the message comprises:

parsing contents of the message, including parsing the message body of the message;

extracting tags from the contents of the message;

determining, based on an order of specificity, an icon or graphical element corresponding to a node object, a user, a universal resource locator, a parent node object, or a default; and utilizing the determined icon or graphical element as the content-aware contextual visual indicator for the message.

\* \* \* \* \*